(12) United States Patent
Hafey

(10) Patent No.: US 9,661,321 B2
(45) Date of Patent: May 23, 2017

(54) REMOTE VIEWING OF LARGE IMAGE FILES

(71) Applicant: StatRad, LLC, San Diego, CA (US)

(72) Inventor: Chris Hafey, Edina, MN (US)

(73) Assignee: NucleusHealth, LLC, San Diego, CA (US)

( * ) Notice: Subject to any disclaimer, the term of this patent is extended or adjusted under 35 U.S.C. 154(b) by 0 days.

(21) Appl. No.: 14/884,574

(22) Filed: Oct. 15, 2015

(65) Prior Publication Data
US 2016/0112703 A1    Apr. 21, 2016

Related U.S. Application Data

(60) Provisional application No. 62/064,282, filed on Oct. 15, 2014, provisional application No. 62/085,138, filed on Nov. 26, 2014.

(51) Int. Cl.
| | | |
|---|---|---|
| *G06K 9/00* | (2006.01) | |
| *H04N 19/00* | (2014.01) | |
| *G06T 5/10* | (2006.01) | |
| *G06T 9/00* | (2006.01) | |
| *H04N 19/33* | (2014.01) | |

(52) U.S. Cl.
CPC .............. *H04N 19/00* (2013.01); *G06T 5/10* (2013.01); *G06T 9/00* (2013.01); *H04N 19/33* (2014.11)

(58) Field of Classification Search
CPC .............. G06T 5/10; G06T 9/00; H04N 19/00
See application file for complete search history.

(56) References Cited

U.S. PATENT DOCUMENTS

| | | | | |
|---|---|---|---|---|
| 5,864,345 A | * | 1/1999 | Wickstrom | G09G 5/02 345/603 |
| 6,002,794 A | | 12/1999 | Bonneau et al. | |
| 6,507,872 B1 | * | 1/2003 | Geshwind | H04L 29/06 348/E7.047 |

(Continued)

FOREIGN PATENT DOCUMENTS

| | | |
|---|---|---|
| EP | 0855838 | 4/2005 |
| WO | WO 01/10130 | 2/2001 |

OTHER PUBLICATIONS

'en.wikipedia.org' [online]. "Burrows-Wheeler transform," Dec. 2015, [Retrieved on Jan. 5, 2016]. Retrieved from the Internet: URL<http://en.wikipedia.org/wiki/Burrows%E2%80%93Wheeler_transform>. 12 pages.

(Continued)

*Primary Examiner* — Li Liu
(74) *Attorney, Agent, or Firm* — Fish & Richardson P.C.

(57) ABSTRACT

In general, the subject matter described in this disclosure can be embodied in methods, systems, and program products for sending image data to a client device. The computing system sends first image data from which a computing device is able to generate an initial display of an image. The initial display is a reduced-resolution version of the image that is reduced in resolution in comparison to a full resolution of the image. The computing system sends second image data from which the computing device is able to generate a subsequent display of the image. The subsequent display of the image is an intermediate-resolution version of the image that has a resolution that is higher than a resolution of the reduced-resolution version of the image and that is lower than the full resolution of the image.

19 Claims, 7 Drawing Sheets

(56) References Cited

U.S. PATENT DOCUMENTS

| | | | |
|---|---|---|---|
| 6,711,297 B1 | 3/2004 | Chang et al. | |
| 6,744,929 B1* | 6/2004 | Okada | H04N 19/60 |
| | | | 375/E7.088 |
| 2005/0156762 A1* | 7/2005 | Tsuru | H04N 19/91 |
| | | | 341/107 |
| 2006/0038879 A1 | 2/2006 | Kremen | |
| 2007/0230829 A1 | 10/2007 | Sirohey et al. | |
| 2007/0280357 A1 | 12/2007 | Sung | |
| 2013/0163894 A1 | 6/2013 | Demos | |
| 2014/0219346 A1 | 8/2014 | Ugur et al. | |
| 2015/0039851 A1* | 2/2015 | Uliel | G06F 9/30036 |
| | | | 712/4 |

OTHER PUBLICATIONS

'en.wikipedia.org' [online]. "DEFLATE," Jan. 2016, [Retrieved on Jan. 5, 2016]. Retrieved from the Internet: URL<https://en.wikipedia.org/wiki/DEFLATE>. 8 pages.

'en.wikipedia.org' [online]. "Delta encoding," Oct. 2015, [Retrieved on Jan. 5, 2016]. Retrieved from the Internet: URL<http://en.wikipedia.org/wiki/Delta_encoding>. 6 pages.

'en.wikipedia.org' [online]. JPEG 2000, Jan. 2016, [Retrieved on Jan. 5, 2016]. Retrieved from the Internet: URL<https://en.wikipedia.org/wiki/JPEG_2000>. 13 pages.

'en.wikipedia.org' [online]. "Lookup table," Sep. 2015, [Retrieved on Jan. 5, 2016]. Retrieved from the Internet: URL<https://en.wikipedia.org/wiki/Lookup_table>. 8 pages.

'en.wikipedia.org' [online]. "Move-to-front transform," Nov. 2015, [Retrieved on Jan. 5, 2016]. Retrieved from the Internet: URL<http://en.wikipedia.org/wiki/Move-to-front_transform>. 6 pages.

'www.dclunie.com' [online]. "Lossless Compression of Grayscale Medical Images—Effectiveness of Traditional and State of the Art Approaches," May 2004, [retrieved on Jan. 5, 2016]. Retrieved from the Internet: URL<http://www.dclunie.com/papers/spie_mi_2000_compression.pdf>. 11 pages.

\* cited by examiner

REMOTE VIEWING OF LARGE IMAGE FILES

CROSS REFERENCE TO RELATED APPLICATIONS

This application claims the benefit of U.S. Provisional Application Ser. No. 62/064,282, filed Oct. 15, 2014, and U.S. Provisional Application Ser. No. 62/085,138, filed Nov. 26, 2014, the content of which applications are incorporated herein by reference in their entirety.

TECHNICAL FIELD

This document relates to transforming and compressing data.

BACKGROUND

Some images are large, such as those obtained by medical x-ray devices. As an example, some full-filed digital mammography x-ray images are over 50 MB in their uncompressed form. Lossless image compression techniques can reduce the size of an image, but the image file remains large enough that transmitting the entire image file to a remote computing device (e.g., a client computing device at which a medical professional has requested the image) requires a person at that remote computing device to wait while the entire image is retrieved over a network before it can be viewed. Moreover, some image compression algorithms are not integrated into certain web browsers. As such, client-side decompression algorithms may have to be programmed in a scripting language (e.g., JavaScript) and transmitted to the client computing device before the image can be decompressed. Decompression algorithms programmed in a scripting language may be executed by a web browser scripting engine, although such an engine may execute instructions slower than if the instructions were executed outside of the web browser scripting engine.

SUMMARY

This document describes techniques, methods, systems, and other mechanisms for transforming and compressing data. In general, a user at a client computing device can request to view an image file that is stored at a remote computing system. The remote computing system may generate a reduced-resolution version of the image, and transmit the reduced-resolution version of the image to the client computing device, for display. At some later point in time, the client computing device may request that the remote computing system send data for generating a display of an intermediate-resolution version of the image. The computing system may send such data, even though it may not itself be viewable as an image. The client computing device, however, may be able to combine the information in the reduced-resolution version of the image with the data from the intermediate-resolution version of the image to generate a display of the intermediate-resolution version of the image.

Image information that is transmitted from the remote computing system to the client computing device may be compressed before transmission to facilitate quicker transmission of the data. Moreover, the remote computing system may transform the data to increase a redundancy of data values that are represented by the data. This transformation may be performed before compression, in order to increase a level of compression. For example, if the image data that represents image pixels does not use some of the most-significant bits of each pixel value (e.g., because the pixel value is stored with 10-bits, but the 10-bit information is stored in two 8-bit bytes), the remote computing system may split the data that makes up each pixel value (e.g., evenly or substantially evenly between the bytes that store the pixel value). Thus, the number of unique values that can appear in each stored byte may decrease, and repetition of data values (and therefore the degree of compression) may increase.

As additional description to the embodiments described below, the present disclosure describes the following embodiments.

Embodiment 1 is a computer-implemented method for sending image data to a client device. The method comprises receiving, by a computing system, a first request to send image data to a computing device. The method comprises sending, by the computing system and for receipt by the computing device in response to having received the first request, first image data from which the computing device is able to generate an initial display of the image, wherein the initial display of the image is a reduced-resolution version of the image that is reduced in resolution in comparison to a full resolution of the image. The method comprises receiving, by the computing system, a second request to send image data to the computing device. The method comprises sending, by the computing system and for receipt by the computing device in response to having received the second request, second image data from which the computing device is able to generate a subsequent display of the image, wherein the subsequent display of the image is an intermediate-resolution version of the image that has a resolution that is higher than a resolution of the reduced-resolution version of the image and that is lower than the full resolution of the image, wherein a portion of the second image data was previously generated by subtracting a value for a pixel in the initial display of the image from a value for a pixel in the intermediate-resolution version of the image, wherein the second image data is configured so that the computing device is able to generate the subsequent display of the image by combining the second image data with the first image data.

Embodiment 2 is the computer-implemented method of embodiment 1, further comprising generating, by the computing system, the first image data by compressing data that encodes the initial display of the image or data that represents a transformation of the data that encodes the initial display of the image.

Embodiment 3 is the computer-implemented method of embodiment 1, wherein the intermediate-resolution version of the image is configured so that a computer is able to losslessly recreate the full resolution of the image by combining the intermediate-resolution version of the image with additional image data.

Embodiment 4 is the computer-implemented method of embodiment 1, wherein the second image data contains insufficient information from which to generate a display of a version of the image without additional image data.

Embodiment 5 is the computer-implemented method of embodiment 1, further comprising generating, by the computing system, the first image data, wherein generating the first image data includes generating a portion of the first image data that represents a value for a pixel in the initial display of the image by combining values for multiple pixels in a version of the image that is higher in resolution than the initial display of the image.

Embodiment 6 is the computer-implemented method of embodiment 1, wherein the second request to send image data to the computing device was sent by the computing device for receipt by the computing system as a result of the computing device receiving user input to zoom into the initial display of the image.

Embodiment 7 is the computer-implemented method of embodiment 1, further comprising determining, by the computing system and based on data that identifies display characteristics of the computing device, to send the first image data, from which the computing device is able to generate the reduced-resolution version of the image, in distinction to image data from which other resolution versions of the image are able to be generated.

Embodiment 8 is the computer-implemented method of embodiment 1, wherein a stored-in-memory size of the intermediate-resolution version of the image is greater than a stored-in-memory size of an uncompressed form of the second image data.

Embodiment 9 is the computer-implemented method of embodiment 1, further comprising generating, by the computing system, the first image data, wherein pixel values in the image are each encoded in a two-byte data unit, and wherein generating the first image data includes: (i) identifying, by the computing system, a quantity of bits in each two-byte data unit in which pixel values are encoded, wherein the quantity of bits is a subset of all bits in the two-byte data unit, wherein the quantity of bits span a range of bits in each two-byte data unit, and (ii) shifting, by the computing system, bits located in an upper half of the range of bits in each two-byte data unit to a different location in each two-byte data unit, while leaving bits located in a lower half of the range of bits in each two-byte data unit in their original location.

Embodiment 10 is the computer-implemented method of embodiment 9, wherein the range of bits occupies all of a lowest byte of the two-byte data unit and a subset of a highest byte of the two-byte data unit.

Embodiment 11 is the computer-implemented method of claim 9, wherein generating the first image data includes compressing a combination of two-byte data units that together comprise the image, after the computing system has shifted the bits located in the upper half to the different location.

Embodiment 12 is the computer-implemented method of embodiment 1, further comprising generating, by the computing system, the first image data by moving a subset of bits in a multi-byte representation of a pixel, so that the subset of bits is moved from occupying part of a first byte of the multi-byte representation of the pixel and part of a second byte of the multi-byte representation of the pixel to only occupying part of the second byte of the multi-byte representation of the pixel.

Embodiment 13 is the computer-implemented method of claim 12, wherein moving the subset of bits from occupying part of the first byte and part of the second byte to only occupying part of the second byte includes inserting binary zeros in a portion of the first byte at which the subset of bits had previously been located.

Embodiment 14 is the computer-implemented method of embodiment 1, further comprising generating, by the computing system, the second image data by spreading binary data that is encoded in a plurality of two-byte data units evenly between a first byte of each two-byte data unit and a second byte of each two-byte data unit, so that the binary data is represented by a certain number of bits in the first byte of each two-byte data unit and a certain number of bits in the second byte of each two-byte data unit.

Embodiment 15 is the computer-implemented method of embodiment 14, wherein: the certain number of bits in the first byte is same as the certain number of bits in the second byte; the certain number of bits in the first byte is a subset of bits in the first byte; and the certain number of bits in the second byte is a subset of bits in the second byte.

Embodiment 16 is the computer-implemented method of embodiment 15, wherein the binary data that is encoded in the plurality of two-byte data units is a result of a delta encoding process performed by the computing system on a full resolution of the image or a reduced-resolution version of the image.

Embodiment 17 is a computer-implemented method. The method comprises receiving, by a computing system, a first request to send image data to a computing device from which the computing device is able to generate an initial display of an image. The method comprises generating, by the computing system, first image data from a full resolution of the image and second image data from the full resolution of the image. Generating the first image data includes: (i) generating a reduced-resolution version of the image that is reduced in resolution in comparison to the full resolution of the image, wherein pixels in the reduced-resolution version of the image are stored in multi-byte data units, (ii) rearranging a number of bits that encode a value of each pixel in each respective multi-byte data unit evenly between each byte in the respective multi-byte data unit, and (iii) sending data encoded in the multi-byte data units through a compression process after the number of bits that encode the value of each pixel for each respective multi-byte data unit has been evenly rearranged. The method comprises sending, by the computing system and for receipt by the computing device in response to having received the first request, the first image data from which the computing device is able to generate the initial display of the image, wherein the initial display of the image is the reduced-resolution version of the image that is reduced in resolution in comparison to a full resolution of the image. The method comprises receiving, by the computing system, a second request to send image data to the computing device from which the computing device is able to generate a subsequent display of the image. The method comprises sending, by the computing system and for receipt by the computing device in response to having received the second request, the second image data from which the computing device is able to generate the subsequent display of the image, wherein the subsequent display of the image is an intermediate-resolution version of the image that has a resolution that is higher than a resolution of the reduced-resolution version of the image and that is lower than the full resolution of the image, wherein a portion of the second image data was previously generated by subtracting a value for a pixel in the initial display of the image from a value for a pixel in the intermediate-resolution version of the image, and wherein the second image data is configured so that the computing device is able to generate the subsequent display of the image by combining the second image data with the first image data.

Embodiment 18 is directed to one or more computer-readable devices including instructions that, when executed by one or more computer processors, cause performance of actions according to the method of any one of embodiments 1 to 17.

Particular implementations can, in certain instances, realize one or more of the following advantages. Large image files may be viewed on a client computing device more quickly than if the entire image were transmitted to the client computing device and then presented for view. Displaying an intermediate-resolution version of an image when a lower-resolution version of the image had already been downloaded to the client computing device may not require downloading all information that would have been needed to view the intermediate-resolution version of the image had the lower-resolution image data not already been downloaded to the client computing device. Splitting information evenly between bytes of data presented for compression can reduce the range of values in that data and repetition of values in that data, which can increase the level of compression of the data.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes transforming and compressing data. For example, image data may be separated into layers of data that represent different resolution views of the image. A layer corresponding to a lower-resolution view may be transmitted for receipt by a client computing device, which may then display the image. The computing device may display a higher-resolution version of the image by combining data from the lower-resolution view with data that can be used to generate the higher-resolution view. In effect, the computing device may losslessly reconstruct the higher-resolution view of the image by partially using the lower-resolution image information and partially using the higher-resolution image information.

Moreover, before each layer of image data is transmitted to the client computing device, the layer of image data may undergo a lossless data transformation and compression process. The lossless data transformation can involve changing the value that is stored in multi-byte units of information so that the binary values that make up the value are stored evenly or somewhat evenly among the multiple bytes, which can reduce the number of values that are repeated in the data and increase subsequent data compression (e.g., with replacement of data with symbols from a symbol lookup table or site specific compression algorithms such as Huffman encoding or deflate). These and other aspects of the system are described in the following figures.

Figure 1:
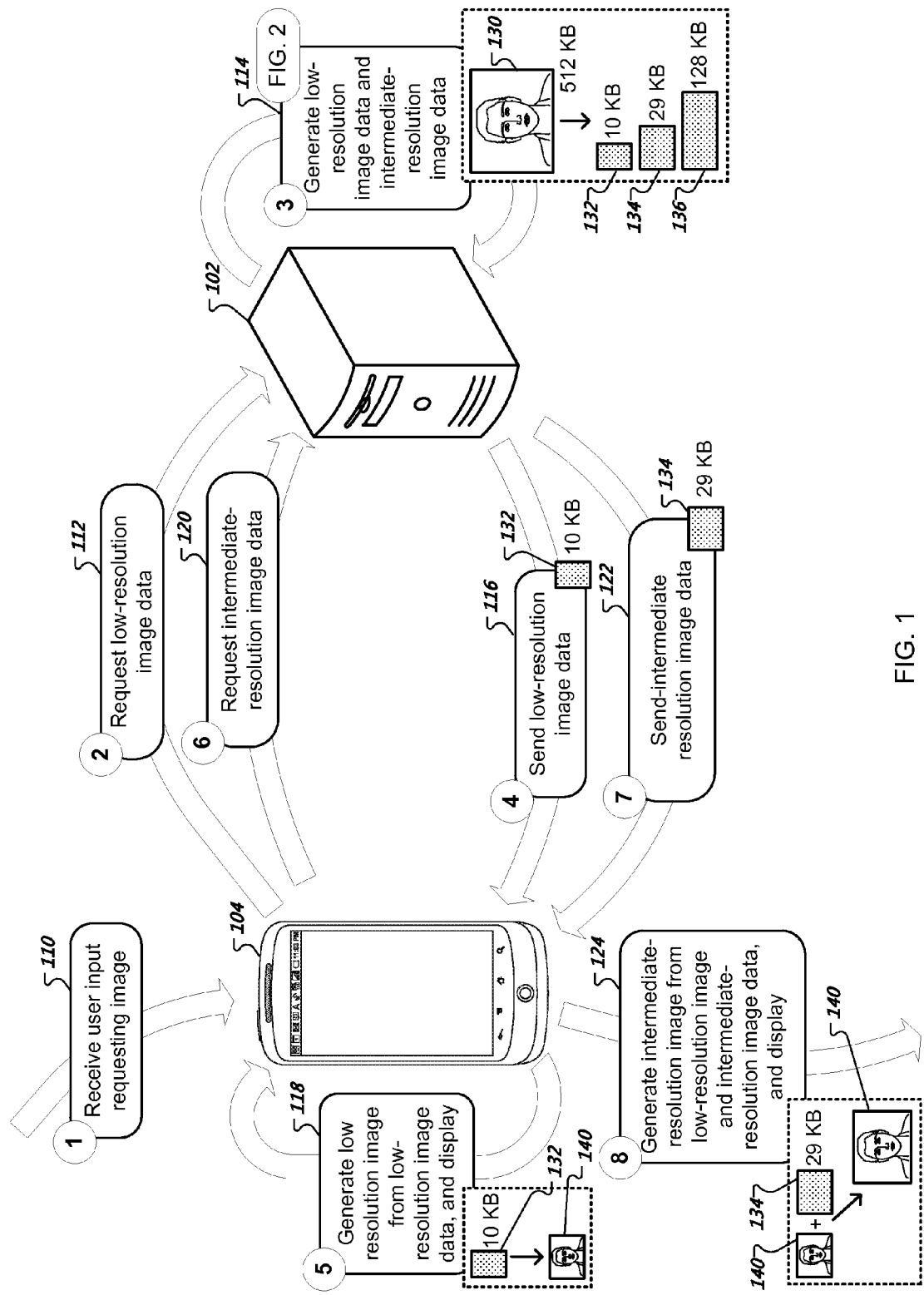
FIG. 1 illustrates a system and various methods for transmitting image data from a computing system to a computing device.

FIG. 1 illustrates a system and various methods for transmitting image data from a computing system 102 to a computing device 104. In this example, the computing system 102 may be a single computer or a set of computers, such as a cloud computing system that operates using a geographically-dispersed set of servers. Computing device 104 may be a mobile telephone, as illustrated in FIG. 1, or may be various other forms of computing devices, such as a tablet computer, a laptop computer, or a desktop computer. The system is not limited to transmitting image data from a computing system of a healthcare organization to a computing device of a medical professional, but examples in this description will refer to such an arrangement in order to explain the benefits of the system.

At box 110, the computing device 104 receives user input requesting an image. For example, a user of the computing device 104 may have launched an application program (e.g., an "app") or navigated to a website that is configured to provide computing devices of medical professionals with medical images. As an illustration, a doctor may be away from the hospital with only his cellphone on him and have an immediate need to view a high-resolution image of a trauma victim that was just admitted to the hospital. The doctor may open a medical image viewer application program or visit a website and, in response, be presented with multiple links or thumbnails for images that the doctor can view on his phone 104. (In some implementations, the thumbnail is a lower-resolution version of the image that was generated through the process of box 206 (FIG. 2).) The doctor may select a link or thumbnail for a particular image, and in response the computing device 104 may transmit a request for the image (box 112).

At box 112, the request for the image is transmitted from the mobile computing device 104 for receipt by the computing system 102. The request may specifically identify that a low-resolution version of the image is requested, or may simply identify the image, and the computing system 102 may determine whether to send the full-resolution version of the image or a lower-resolution version of the image. In some examples, the request 112 or a previous communication from the computing device 104 to the computing system 102 may include information that identifies display capabilities of the computing device 104. For example, the request 104 may include information that identifies a type of mobile phone or a maximum resolution of a display of the mobile phone (e.g., 1334×740 pixels). In some examples, the computing system 102 may receive information that specifies data transmission capabilities of the computing device 104 (e.g., a speed at which information can be received by the computing device 104 over a network, or whether the computing device 104 is presently connected to the internet through cell towers or through Wi-Fi).

The computing system 102 receives request 112, and in response sends low-resolution image data 132 for receipt by the computing device 104 (box 116). The low-resolution image data 132 may be generated by the computing system 102 in response to having received request 112, or may have been generated by computing system 102 at a previous point in time (e.g., the original image 130 may have been pre-processed to generate image data 132, 134, and 136). In fact, the low-resolution image data 132 (and other layers of the image data, such as intermediate-resolution image data 134 and high-resolution image data 136) may have been generated by a different computing system and transmitted for storage by computing system 102. The actions for generating the various layers of image data 132, 134, and 136 are represented by box 114, which is described in greater detail with reference to FIG. 2, to which the focus of this description will turn before returning to FIG. 1 for a description of boxes 116 through 124.

Figure 2:
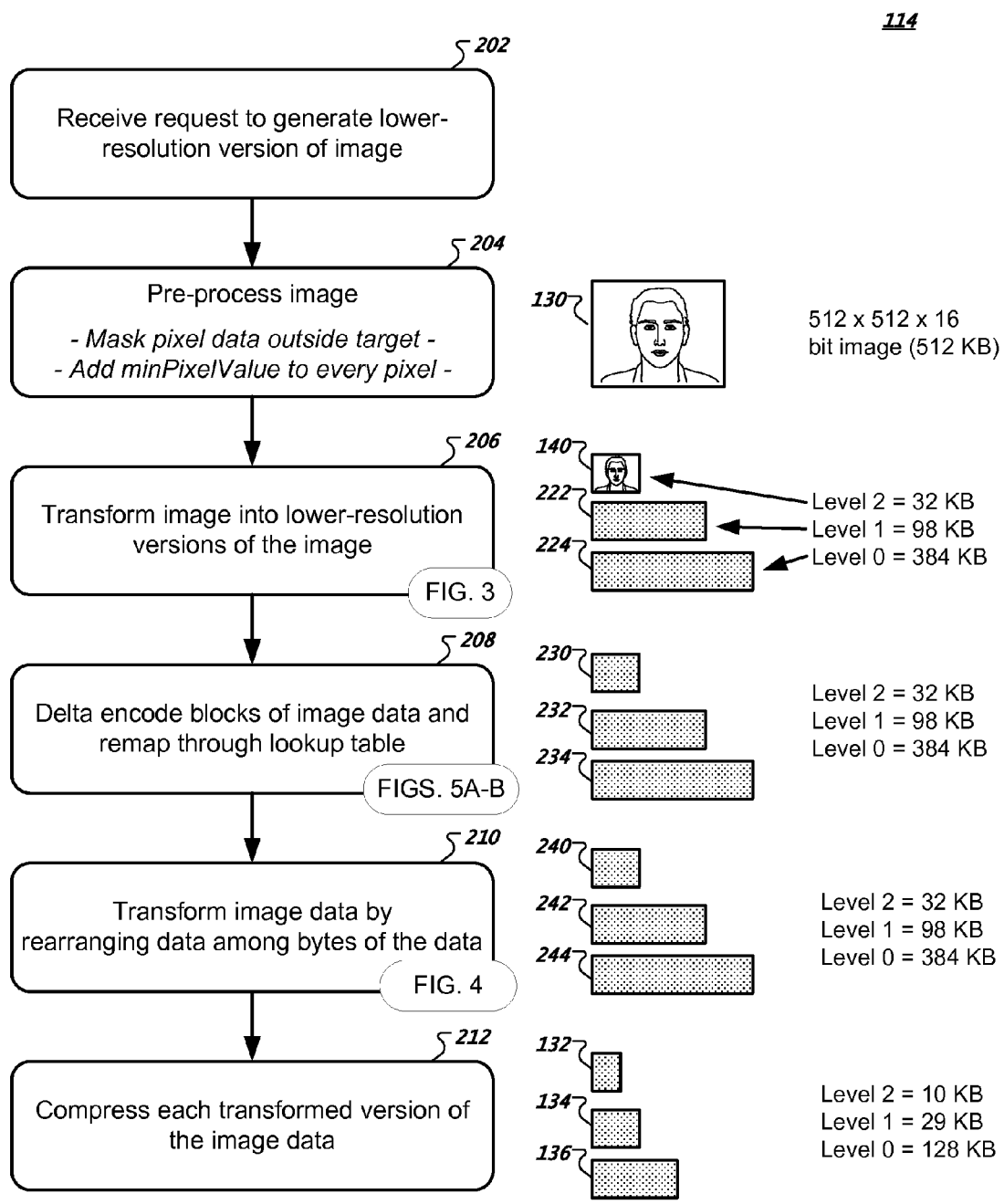
FIG. 2 illustrates a process for generating lower-resolution versions of an image and data required to reconstruct to higher resolution versions including the original lossless version.

FIG. 2 illustrates a process for generating lower-resolution versions of an image and image data needed to reconstruct higher resolutions of the image including the original lossless version. The process may receive an image 130 (sometimes referred to herein as a full resolution image) as an input, and may output multiple blocks of compressed data 132, 134, and 136, which represent data for the image at differing resolution levels. To produce the blocks of compressed data 132, 134, and 136, the process may produce corresponding blocks of uncompressed data 140, 222, and 224. The blocks of uncompressed data 140, 222, and 224 may then be delta-encoded and remapped through a lookup table (box 208) to produce blocks of encoded and remapped data 230, 232, and 234. The delta-encoded and remapped data may then be further transformed to increase duplication of data values in the data (box 210) to produce blocks of transformed data 240, 242, and 244. This information may then be compressed (box 212) to produce the aforementioned blocks of compressed data 132, 134, and 136, some of which may be transmitted for receipt by the computing device 104. Each of the boxes shown in FIG. 2 are explained with additional detail below.

At box 202, the computing system receives a request 202 to generate a lower-resolution version of an image and image data needed to reconstruct higher resolutions of the image including the original lossless version. The request 202 may be the same as request 112 (FIG. 1), may be an independent request, or may be a request that was initiated by request 112 (FIG. 1). The request 202 to generate the lower-resolution version of the image may specify a desired or target lower-resolution version of the image, or may not. The request 202 may identify the image for which the lower-resolution version is to be produced. In this illustration, image 130 is a full-resolution image for which the process of box 114 is to generate a lower-resolution version (e.g., lower-resolution version 132). In this illustration, image 130 is a medical image of a user's head (e.g., a head cranial computed tomography (CT) scan).

At box 204, the computing system 102 pre-processes the image. The pre-processing can include calculating the minimum and maximum pixel values while the pixel padding value is excluded. The pre-processing can also include changing values of pixels located outside of the anatomy illustrated in the image to the minimum pixel value. For example, a medical imaging device can insert pixel padding values into an image to denote those portions of the image that are essentially filler information to fill out the sides of the image to meet a certain image shape and that do not represent data that was captured by the medical imaging device. The pixel padding values can be set by the medical imaging device to an arbitrary number (e.g., "FFEE" hex), and the pre-processing can change these values to a value one less than the minimum pixel value (e.g., minimum value is "0001" hex, pixel padding values remapped to "0000" hex).

The pre-processing of the image can also include subtracting minPixelValue from every pixel in the image, which may make the minimum value "0000" (hex). Doing so can provide a performance boost in processing the image data by the client computing device 104, since some JavaScript engines are optimized to access arrays that are zero based.

At box 206, the computing system transforms the image into a lower-resolution version of the image. This process is now described in greater detail with reference to FIG. 3, although this description will later return to describe boxes 208, 210, and 212 of FIG. 2.

Figure 3:
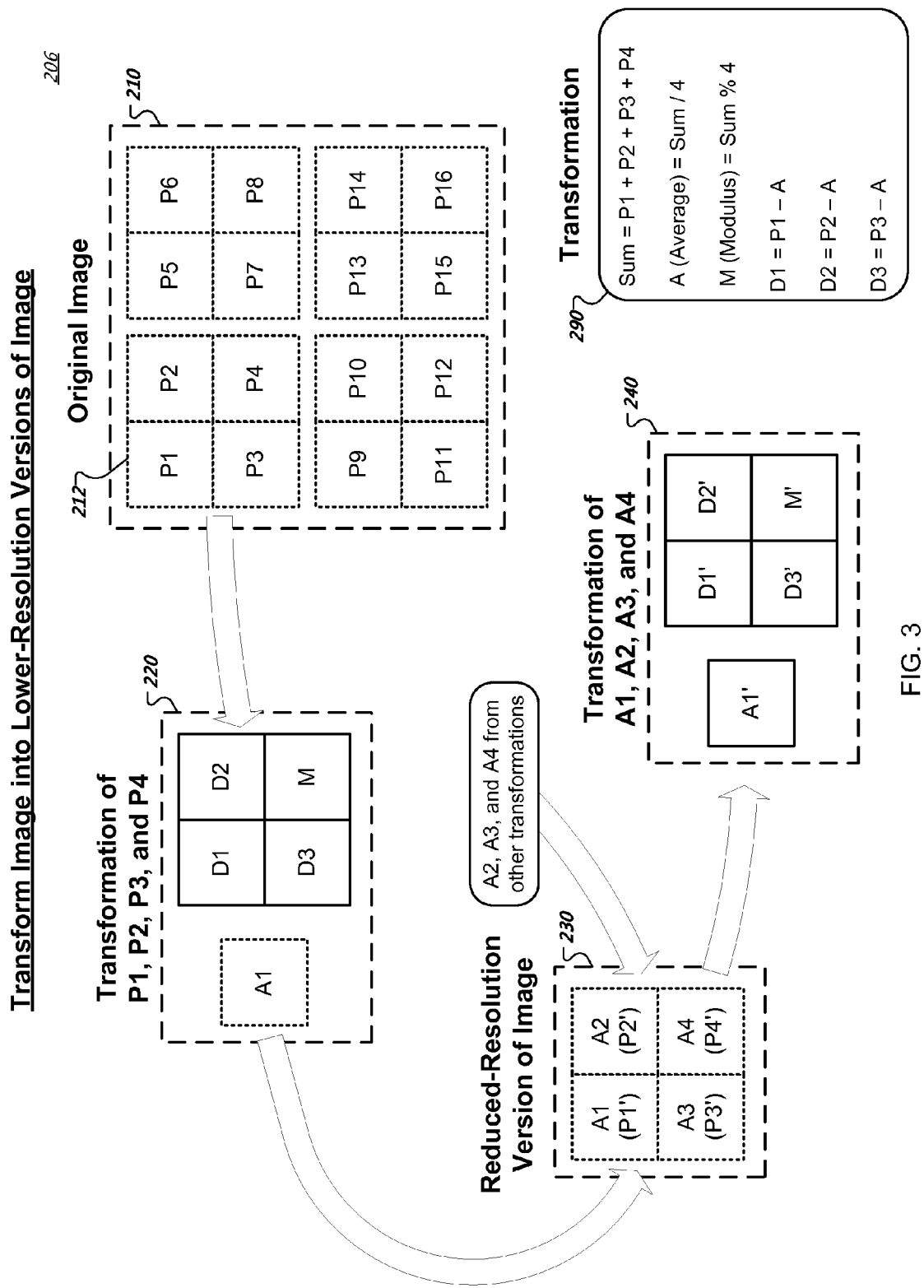
FIG. 3 illustrates a process for transforming an image into lower-resolution versions of the image and data to reconstruct to higher resolution versions including the original lossless version.

FIG. 3 illustrates a process for transforming an image into lower-resolution versions of the image. Although FIG. 2 indicates that the process is to be performed on a 512 KB image 130, a simplified illustration of the process in FIG. 3 is shown with reference to 16-pixel image 210. The process of box 206 includes multiple iterative or recursive transformations, as described below.

An initial iteration of the transformation operates on four-pixel blocks of the original image 210 (e.g., on each 2×2 block of pixels). In this illustration, the transformation procedure is described with reference to pixels P1 through P4, although the same procedure may be applied to pixels P5 through P8, pixels P9 through P12, and pixels P13 through P16. With reference to pixels P1 through P4, the procedure uses the algorithms shown in the transformation section 290 that is shown in FIG. 3. In particular, the computing system generates a sum of pixels P1 through P4 (e.g., Sum=P1+P2+P3+P4), and then generates an approximation of that sum (e.g., A (Approximation)=Sum/4). (In some implementations, the approximation is an average of the sum.) Transformed values D1 through D3 and M are generated using the other algorithms shown in transformation section 290 (e.g., M (Modulus)=Sum % 4); D1=P1−A; D2=P2−A; D3=P3−A). Accordingly, a single iteration of the transformation generates transformed data 220. (In this example the "A (Approximation)" value is illustrated as A1, because A values from other transformations are presented as A2, A3, etc.). The "A" or "Approximation" values output from each transformation of four pixels represents an approximation of those four pixels. As a rough analogy, the shading of each four-pixel group is mixed together to produce a single shade. In some implementations, the process may operate on blocks of pixels different than 2×2 (e.g., 1×4, 3×3, etc.) In some implementations, the value that results from processing each block of pixels may be different than an exact average or arithmetic mean, and may otherwise combine the values of each pixel in the block into a single pixel value.

All of the A values from the initial transformation may be combined to generate a reduced-resolution version of the image 230 that would have one-fourth as many pixels as the original image 210 (or a close number, when the number of pixels in original image 210 is not divisible by exactly four). In some examples, this reduced-resolution version of the image 230 is the image that is sent to the client computing device 104.

In some examples, another iteration of the transformation is performed on the reduced-resolution version of the image 230. For example the computing system may determine whether the reduced-resolution version of the image 230 has satisfied criteria for transmission to the client computing device 104. For example, the computing system 102 may have stored a default resolution at which it will stop recursively applying the transformation (e.g., once the reduced-resolution version of the image is at a threshold resolution such as 128×128, or when it is determined that another iteration of the transformation will yield an image that has a resolution that is less than the threshold resolution).

In some implementations, the threshold resolution at which the computing system 102 may stop performing the procedure is less than a resolution of the computing device 102 (e.g., at 256×256 pixels). In some implementations, the threshold resolution at which the computing system 102 may stop performing the procedure may be a determined based on information that identifies a resolution of the computing device 104. For example, the computing system 102 may receive information indicating that the computing device 104 has a display with a resolution of 1334×740 pixels, and therefore may perform successive iterations of the transformation until a reduced-resolution version of the image 230 is created which has a resolution of 1334×740 or greater, and in which another iteration of the transformation would produce an even more reduced-resolution version of the image 230 which would fall beneath the 1334×740 resolution threshold. In other words, the process of box 206 may be configured to continually perform the above-described transformation, until an image of appropriate resolution is created for display on the computing device 104. The appropriate resolution may be equal to or just above the resolution of the display of the computing device, because any greater resolution would not be represented on the display on the computing device. Should a user zoom into the image, additional information may be retrieved from the computing system to generate a higher-resolution version of the image. In some examples, the resolution of the image that is to be generated and sent to the client-computing device is determined based on an identified speed of connectivity of the computing device 104 to its network, or its type of connection to the network.

This description now turns to describe a subsequent iteration of the transformation that is performed on four-byte or pixel combinations of A values that were output from the initial transformation. For example, the transformation may be performed on the A1 through A4 values shown in the reduced-resolution version of the image 230. In this recursive application of the transformation, each of the A values is treated as a "P" value for purposes of the algorithms shown in the transformation section 290. This treatment is reflected by the alternate names for A1 through A4 shown in FIG. 3 (i.e., the data is alternatively named P1' through P4'). Application of these algorithms yields transformed data 240, which includes an A1', a D1', a D2', a D3', and an M'.

In some versions of the process performed in box 206, full- and intermediate-resolution versions of the image may be discarded by the computing system 102, and the computing system 240 may store the lowest-resolution version of the image created by the process (A1' in the illustration shown in FIG. 3), along with the D1 through D3 and M values for each layer of transformations. (The data that may be discarded while still permitting lossless reconstructed is illustrated with dotted lines in FIG. 3, while data for each stage of the transformation process is grouped by dashed lines.) The D1 through D3 and M values are stored for each layer of transformations, because computing systems can losslessly recreate the original image 210 using the lowest-resolution version of the image and the "D" and "M" values. For example, the reduced-resolution version of the image 230 can be recreated using values A1', D1', D2', D3', and M'. The algorithms for doing so follow. P1=D1+A. P2=D2+A. P3=D3+A. P4=(A*4)−P1−P2−P3+M.

This storage of various layers of information is illustrated in FIG. 2. In that example, image 140 is the lowest-resolution image that was generated by the process of box 206 (a 128×128×16 32 KB image in this illustration). Data 222 represents the data that can be combined with image 140 to create a higher-resolution image (256×256×16 128 KB image). For example, image 140 (FIG. 2) can correspond to pixel/image A1' (FIG. 3), while data 222 (FIG. 2) can correspond to D1', D2', D3', and M' (FIG. 3). Along similar lines, once the higher-resolution image is created from image 140 and data 222, an even higher-resolution image can be created by combining that image with data 224, which may correspond to D1, D2, D3, and M (FIG. 3). In the illustration shown in FIG. 3, this reverse transformation would yield original image 210. The reconstruction may be lossless.

It should be noted that the illustration of process 206 that is shown in FIG. 3 is atypical, in that it takes a small 16-pixel image, and reduces it to a single pixel A1'. In a typical process, the initial image would be larger than 16 pixels, and the image that is output would be larger than a single pixel. In other words, the process described in box 206 will often stop its transformations before the image is reduced to a single pixel.

Box 208 is next in the process that is shown in FIG. 2. At box 208, the computing system 102 performs various processing and transformations on each layer of data that is output from the processes of box 206 (e.g., on each of image 140, data 222, and data 224). Still, this description is going briefly pass over its discussion of box 208 and dive into the discussion of box 210. A reason for this is that boxes 208 and 210 are described with illustrations using just a handful of pixels, but the processes of box 208 simplifies the example data to such a degree that the benefits of box 210 are not as clearly shown. Thus, this description first illustrates the operation and benefits of box 210, and then turns back to describe another example in which data is processed by the operations of box 208 and is then processed by the operations of box 210. In some implementations, the transformation process described with respect to box 206 may not be performed but the operations of box 208 may be performed. In some implementations, the operations of box 208 are optional.

At box 210, the computing system performs a transformation of the image data by rearranging the data among multiple bytes. For example, image data is sometimes stored as a collection of 16-bit words (two 8-bit bytes) that each represent a single pixel of an image or a single channel of image data (e.g., the red, green, or blue data for a single pixel). The medical imaging device, however, may not generate data that can fill all values capable of being represented by a 16-bit word. For example, a 16-bit value can store $2^6$ or 65,536 distinct values between 0 and 65,535, but an example medical imaging system may only be configured to generate 10 bit values (i.e., $2^{10}$ or 1024 values) for a single pixel region of the image. In such a system, the 10-bit information for each pixel may still be stored in a 16-bit word. As such, 6 bits may be wasted for each word. Moreover, the lowest byte (i.e., 8 bits) from each pixel in an image could contain up to 256 different values, while the highest byte may only contain image data in its lowest-two bits, such that the highest byte from each pixel may contain no more than four distinct values.

The wide range of values for the lowest byte means that a process that replaces values in a byte with values from a lookup table may not be as efficient because the lookup table for the lowest byte may still contain up to 256 values. (In this description, a symbol tree is may be used instead of a lookup tree.) A process that decreases the number of unique values found among all the lowest bytes in the image may increase the repetition of values. An example benefit of such increased repetition could include a reduced number of unique values in the lowest byte, and thus a decreased-in-size lookup table. A decreased-in-size lookup table could allow all values among the lowest bytes in the image to be represented by lookup table numbers that are smaller (e.g., no more than 5 bits for each lowest-byte value, rather than requiring 8 bits for each lowest-byte value).

A way to gain the benefits of increased duplication of values is to shift some of the bits of information that are located in each lowest byte into the highest byte. Although this increases the number of unique values that may be represented in the highest byte, the overall reduction in unique values found between the combination of the lowest and the highest bytes may be reduced. An example of a transformation that performs this data shifting process is now described with reference to FIG. 4.

Figure 4:
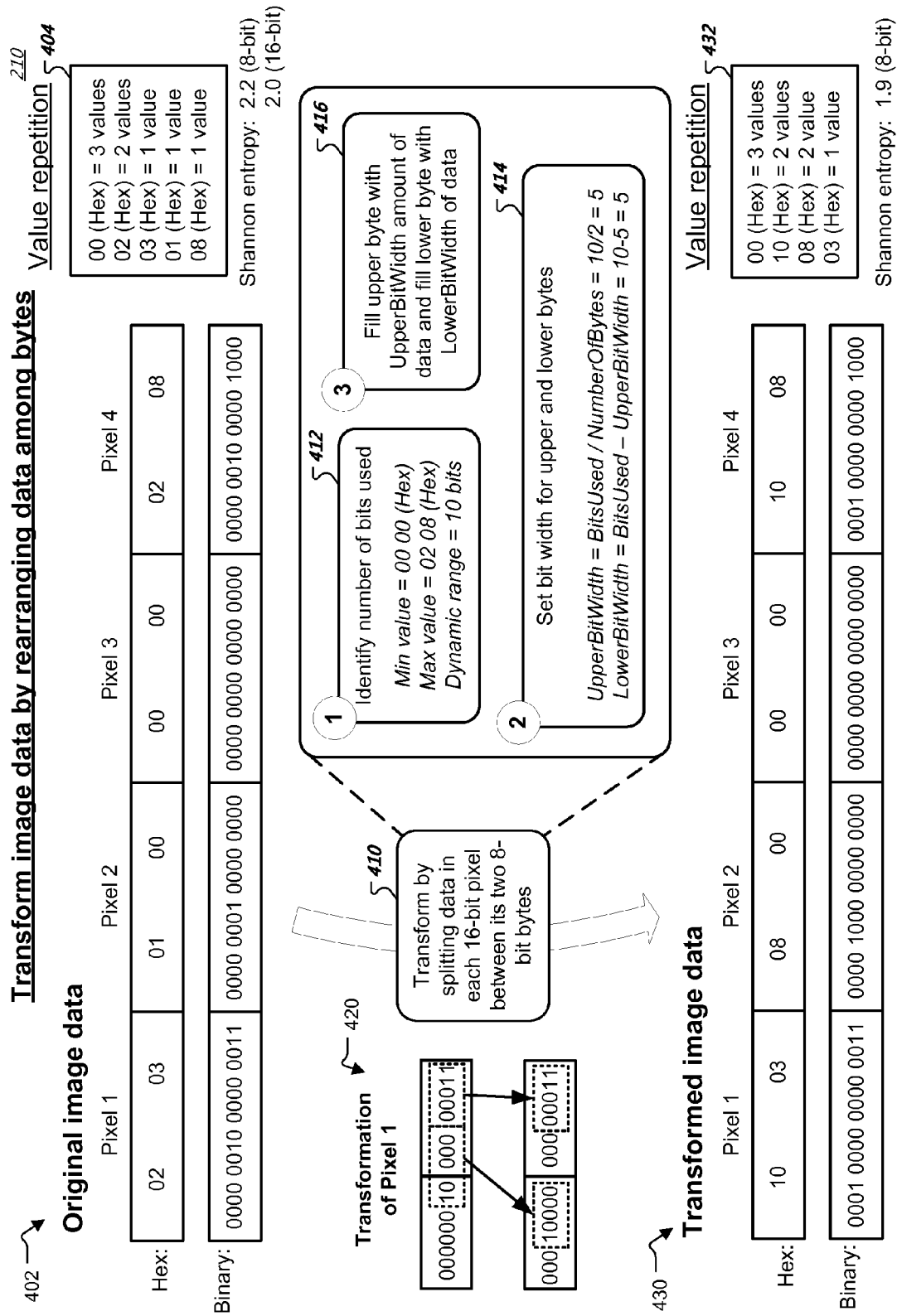
FIG. 4 illustrates a process for transforming image data by rearranging the bits of the data among bytes of the data.

FIG. 4 illustrates the process for transforming image data by rearranging the data among bytes of the data. The original image data 402 represents data that is fed into the transformation process of box 210. This data can be from any layer of the image, and does not have to be data from the "original" image. For example, the data that is fed into the transformation process of box 210 may be image data 140 (FIG. 2) if the operations of box 208 are not performed, or image data 230 (FIG. 2) if the operations of box 208 are performed. The data input into transformation process 210 can also be image 130, data 222, data 224, data 232, or data 234 in various examples.

The original image data 402 is illustrated in FIG. 4 in both hexadecimal and binary format. In this illustration, each 16-bit word of information represents a pixel of the image (hence the labelling of Pixels 1 through 4), but each 16-bit word in the set of data being processed does not need to represent a pixel. For example, in the example in which the input data is data 222 (FIG. 2), that data is a collection of the D1, D2', D3', and M' values that are described with respect to FIG. 3. The value repetition table 404 shows that there are five unique 8-bit values represented among the eight bytes that comprise the original image data.

The transformation of the data is represented by box 410, which includes boxes 412, 414, and 416.

At box 412, the computing system identifies the number of bits used. In some examples, the image data is accompanied by metadata that indicates how many bits of each word is used to represent values. For example, the medical imaging device may record 10-bit values, and may append data to the image which indicates that the pixel values were recorded as 10-bit data. In some examples, the computing system has to identify the number of bits used to record the values. For example, the computing system may analyze the information to identify the minimum value ("0000" hex in this example) and the maximum value ("0208" hex in this example). The range of values represented between this span only occupy 10 bits of information, and thus 10 bits may be set as the dynamic range of the data.

In the above-described example, the data starts at "0000" (hex) and there are no values near the top of the range (e.g., at "FFFF" hex or "EF10" hex). This can be due to the pre-processing performed at box 204 (FIG. 2), in which the minPixelValue was added to every image value. For example, if the lowest value was "0004" (hex) (which represents "0000 0000 0000 0100" binary), then shifting the data down to "0000" (hex) would reduce the need for two bits. Similarly, the same pre-processing remaps the padding data, which sometimes is represented with values near the top of the range (e.g., at "FFFF"). Without these values remapped, the range of possible values extends from "0000" or near it, all the way up to "FFFF." As such, the pre-processing allows the bit-rearranging transformation described with respect to box 210 to work with the range of data values that represent human anatomy. Accordingly, the pre-processing may be performed just before or as a part of box 410, rather than at the position at which box 204 is illustrated in FIG. 2.

In any event, once the range of values represented by each 16-bit value in the image is determined, the operations of box 414 are performed to identify how to rearrange or split the values in that range among the two bytes of the word. In the example in which there is an even number of bits in the range of values (10 bits in this example), then the bits may be evenly distributed between the two bytes (5 bits in the highest byte and 5 bits in the lowest byte). In an example in which the number of bits in the range of values is odd (e.g., 11 bits) then the bits may be substantially evenly distributed between the two bytes (e.g., 5 bits in the highest byte and 6 bits in the lowest byte, or vice versa), such that the number of bits assigned to the highest byte and the number of bits assigned to the lowest byte differ by no more than one bit. In some implementations, the bit assignments may differ by more than one bit. In some implementations, the transformation may not evenly or substantially evenly rearrange or split data between multiple bytes. For example, a transformation of an 8-bit number stored in a two-byte data unit may move the data so that a single bit is stored in an upper byte and so that seven of eight bits are in a lowest byte.

At box 416, the upper byte of each word of image data is filled with the number of bits assigned to the upper byte, and the lowest byte is filled with the number of bits assigned to the lowest byte. The data is filled from the originally-identified range of values. For example, the transformation of pixel 1 is illustrated as item 420 in FIG. 4. That example shows a word with a range of 10 bits. As a result of the transformation, the lowest 5 bits are left in the lowest byte of the word and the highest 5 bits are moved to the highest byte of the word. This process can include masking or assigning "0" values to the bits in the lowest byte that have no assignment. In this example, the bits at the beginning of the highest byte and the bits at the beginning of the lowest byte represent the original data in order, except that "000" (binary) has been inserted between the 5th and 6th bit of the substantive data. The data retains its original order in this example, but the data may not retain its original order.

It should be noted that the range of 10 bits shown by the transformation of pixel 1 begins with a binary "1" and ends with a binary "1", but this does not have to be the case. For instance, the identified number of bits used is that among all values in the data being translated. As an illustration, the value "0000 0000 0000 0100" (binary) may have a range of 10 bits and may be operated on accordingly.

Transformed image data 430 illustrates the result of transforming the four pixels of data in the original image data 402 using the above-described process. As shown by value repetition table 432, the transformed data 430 includes only four unique values, with more repetition among those values than in the original image data 402 (compare value repetition table 432, with Shannon entropy values of 1.9 (8-bit) and 2.0 (16-bit), to value repetition table 404, with Shannon entropy values of 2.2 (8-bit) and 2.0 (16-bit)).

In some implementations, the transformation process described with reference to FIG. 4 can be performed with data that is recorded using data quantities that are larger than 16 bits. For example, the transformation process can be performed with data that is stored in quantities of 3 bytes (24 bits), 4 bytes (32 bits), or more. In each example, the original data, which may not require all bits in the specified data quantity, is rearranged or split among the bytes or sub-portions of the data quantity. In some implementations, the data quantities are not multiples of 8-bit bytes. For example, data may be recorded in a data quantity of two 5-bit data sub-units, but the data may only fill 8 bits of the two 5-bit data sub-units. As such, the data may be spread so that each 5-bit data sub-unit stores four bits.

Although this disclosure discusses the data spreading transformation process with respect to image data, the transformation and its benefits are not limited to image data and may be used to increase the repetition of values of other types of data in which each data value is stored in a multi-byte data unit, but the data values do not span the entire range of values that the multi-byte data unit is possible of representing. An example scenario in which the data-spreading transformation process would also have benefit is with high-fidelity scientifically-measured data. For example, scientific test instruments that measure precise distances, temperatures, or velocities may generate information that is stored in 16-bit or 24-bit data units, but the information may use less than all of the required data units. The techniques described in this document (at least those described with respect to boxes 208, 210, and 212 of FIG. 2) can be used to transform and compress such data without performing the operations of other processes in the document (e.g., those described with respect to FIG. 3).

Returning to the process of box 114 that is illustrated by the combination of boxes 202 through 212 in FIG. 2, the transformation of data at box 210 results in data 240, 242, and 244, which is then compressed at box 212. In some examples, the compression includes applying the deflate data compression algorithm, alone or as implemented by the gzip program. Other compression algorithms may be used as well. In some implementations, instead of or as part of applying a compression algorithm, the transformed image data is run through LZ77, or some other process by which repeated strings are detected and replaced by the string and number of repetitions. For example, if "E100E100E100E100" (hex) is detected, it could be replaced by an "E100", and special symbols for the distance 2 and length 6. (The distance and length values are identified as 2 and 6 because there are 4 repetitions of the hex bytes "E1" and "00," and LZ77 places a special marker which indicates that the process should go back in the stream a "distance" number of bytes, and repeat it for up to "length" bytes, so after "E100" will be special codes to say go back 2 bytes to right before "E100", and repeat it for up to 6 bytes, which expands to an additional 3 copies of those two bytes "E100E100E100E100.") Replacing repeated strings with a more compact representation may reduce an overall size of the data because of fewer bits needed to represent the repeating strings. The level of compression that results from the LZ77 or similar process may increase with as the level of repeated values in the data increases. For at least this reason, applying the data rearrangement transformation before the LZ77 or similar process may increase the level of compression.

In some implementations, instead of or as part of applying a compression algorithm, the transformed image data or the other data proceeded via the LZ77 or similar process is run through a Huffman coder, or some other process by which a symbol tree is created to replace values that are found in the transformed image data with a different symbol that uses fewer bits to encode the more common symbols. For example, if "E1" (hex) is the most common value in the image data, it can be coded using fewer than 8 bits. Mapping the values in the transformed data through the symbol tree may reduce an overall size of the data because commonly occurring symbols are encoded using fewer bits than the original symbol. Further, the level of compression may increase when the data provided into such a replacement process includes a smaller number of unique values (and those values are repeated more), because there may be fewer replacement values and thus the longest replacement value may be smaller in individual binary length. Accordingly, applying the data rearrangement transformation before the replacement process can increase the compression that results from the replacement process.

Turning back now to box 208 (FIG. 2), the process in box 114 of generating the lower-resolution layers of the image can include delta-encoding the lower-resolution versions of the image and remapping the delta-encoded data through a lookup table before the data-rearranging transformation of box 210 is applied. An example illustration of this process is described with respect to FIGS. 5A-B.

Figure 5A:
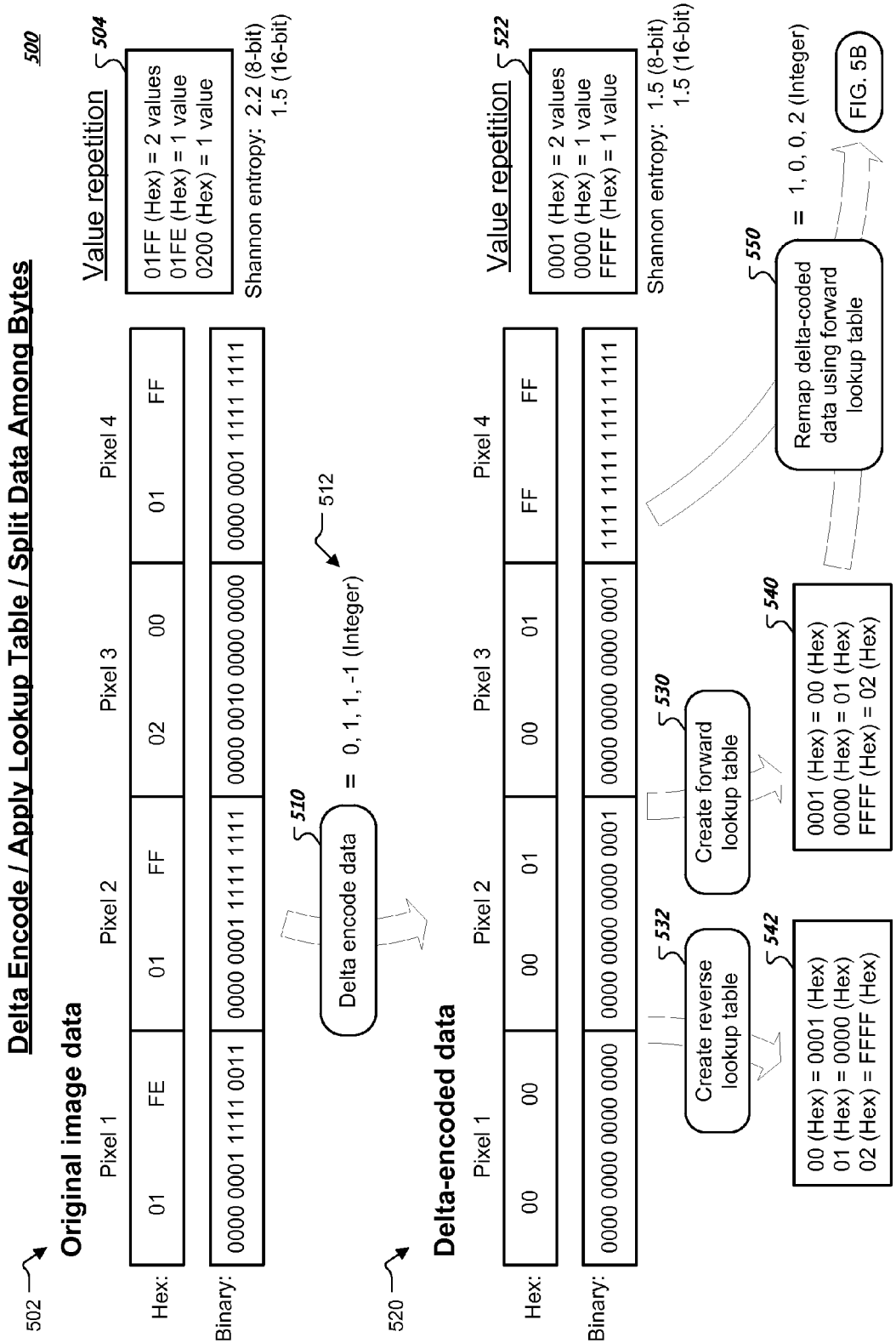
FIGS. 5A-B illustrate a process for delta-encoding the image data and remapping the delta-encoded data through a lookup table.

FIG. 5A shows the original image data 502 that is input into the process 500 for delta encoding data and applying a lookup table. The original image data 502 represents the input into the process 500, such as data 140, 222, and 224 (FIG. 2), and does not necessarily mean that the data is that of the original image 130. As illustrated by the value repetition table 504, the original image data requires three unique 16-bit values and only includes a single instance of repetition. In this example, the original data has a Shannon entropy value of 2.2. In a typical image, the original image data 502 may include many more 16-bit values, such that there would be more unique 16-bit values.

At box 510, a delta-encoding process is applied to the original image data 502, for example, by the computing system 102. Delta encoding is a way of storing or transmitting data as differences between sequential data values rather than as an absolute value for each data value. For example, because the change between Pixel 1 and Pixel 2 in the original image data 502 is "1", the value of Pixel 2 can simply be "1". Similarly, because the change between Pixel 2 and Pixel 3 is "1", the value of Pixel 3 can be "1". The change between Pixel 3 and Pixel 4 is "−1" (integer), and thus the Pixel 4 value can be "FFFF" (hex). For simplicity of illustration here, the value for Pixel 1 is set to "0", even though the first value in a series of delta-coded values would sometimes be set to its absolute number so that the absolute value for every data value in the series could be recovered.

The integer values of the output of the delta-encoding process (i.e., 0, 1, 1, −1) is shown at item 512, and the hexadecimal and binary representations of the delta-encoded values are shown by the item labeled delta-encoded data 520. As shown by the value repetition table 522, this four-pixel example still includes three unique 16-bit values, although a reduction in unique values may be noticed over data that includes more than four 16-bit values (e.g., in a 512 KB image). Moreover, the value repetition in 8-bit bytes has decreased from five (for the original image data 502) to three (for the delta encoded data). Similarly, the Shannon entropy has decreased from 2.2 to 1.5.

At boxes 530 and 532, forward and reverse lookup tables 540 and 542 are created, which the computing system 102 will use to remap the delta-coded data to new data values. For example, the forward lookup table 540 can be used to map the most-repeated data values in the delta-encoded data 520 to values that require the least bits for their representation. For example, because the value "0001" (hex) is the most repeated value in this example, the table can map this value to "00" (hex). As apparent from this illustration, another benefit of mapping data this way is that a set of 16-bit values can be mapped to a set of values that require less data (e.g., 8-bit values), if the number of unique values in the original set can be represented by such a smaller number. The forward lookup table 540 may be created by sorting the values by frequency of occurrence. A reverse lookup table 532 can be created by mirroring the values in the forward lookup table 530. The computing system 102 can use the forward lookup table 540 to remap the delta-coded data 520 before the data is compressed and transmitted to client computing device 104, while the client computing device 104 can use the reverse lookup table 542 to reverse the mapping of the delta-coded data.

Figure 5B:
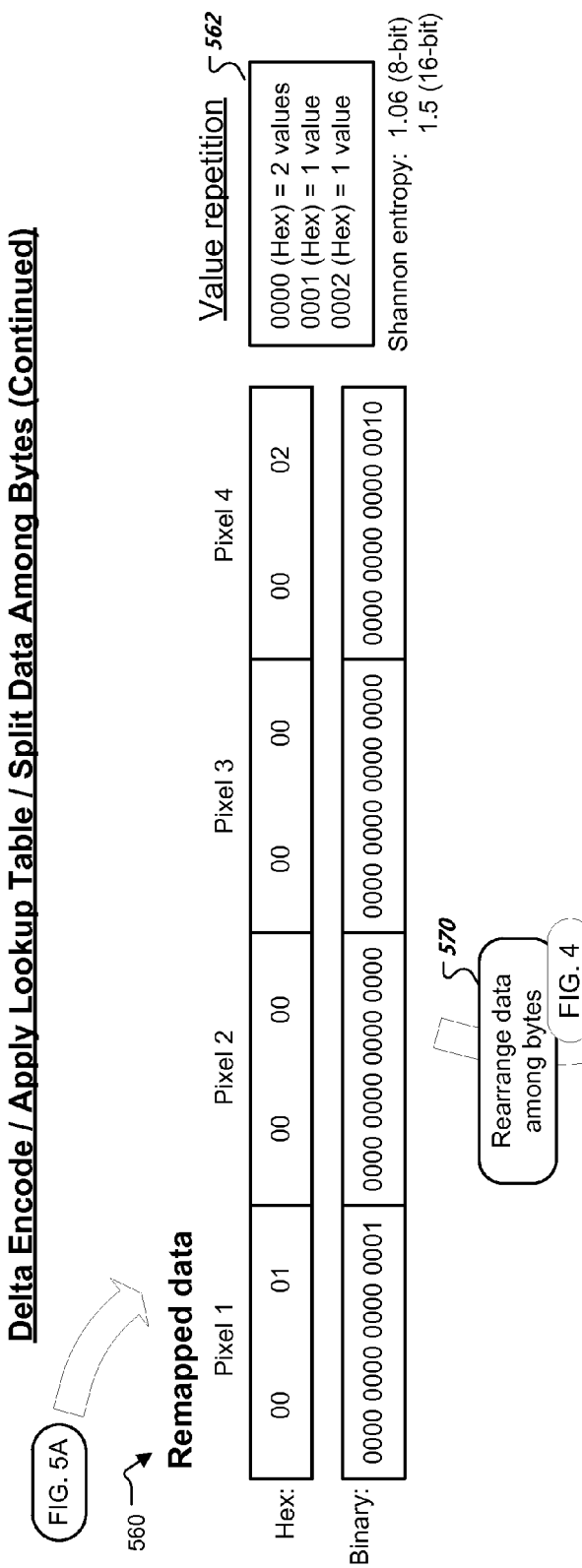
Figure 5B:
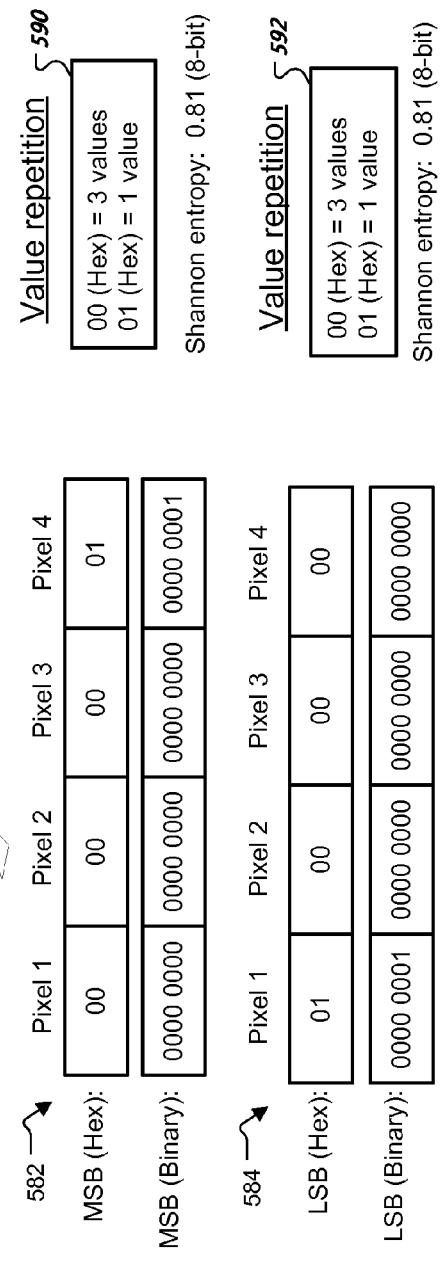

At box 550, the delta-coded data is remapped using the forward lookup table 540. This results in an output data stream of 1, 0, 0, 2 (integer). This data is also identified in hexadecimal and binary at the remapped data section 560 (FIG. 5B). As shown by the value repetition table 562, the number of unique 16-bit values is still three, but the Shannon entropy has further dropped to 0.8. The number of unique 16-bit values may have decreased if the process was being performed on a data set with more data values.

At box 580, the data in 560 is transformed so that the data represented by each pair of MSB and LSB bytes is rearranged or split evenly or substantially evenly between the two bytes, which results in the single byte arrays 582 and 584. The data-rearranging process is described in greater detail with reference to FIG. 4. As shown by value repetition tables 590 and 592, the Shannon entropy has been further reduced. Although FIG. 4 illustrates that the transformed image data 430 is output as a single array that includes both the highest 8-bit byte of each 16-bit word (also referred to as the most-significant byte or MSB) and the lowest 8-bit byte of each 16-bit word (also referred to as the least-significant byte or LSB), the process of FIG. 4 may output the transformed image data 430 as two arrays—one for the MSBs and one for the LSBs, as shown in FIG. 5B. Arranging information into separate arrays for the MSB and the LSB can increase the number of repeated values in the byte stream even further, which may further increase the level of compression performed by the subsequent data compression algorithm. For example, the compression process may operate on each array separately, such that a separate lookup table is created for each array. The transformation into two arrays can be performed before the above-described rearranging of bits, after the rearranging of bits, or concurrent with the rearranging of bits.

As mentioned earlier, the data-rearranging process is not as apparent in this simple four-value analysis of delta-encoded data. In this example, the range of possible values is limited to two bits, and thus rearranging or splitting the values between LSB and the MSB only results in a changed value to the data for Pixel 4, in which the values are changed from "0000 0000" (MSB binary) "0000 0010" (LSB binary) to "0000 0001" (MSB binary) "0000 0000" (LSB binary). In other words, the two-bit number "01" (binary) was originally stored wholly in the last two bits of the LSB, but rearranging that number so that one bit is stored in the MSB and one bit is stored in the LSB results in the binary "1" being moved from the LSB to the MSB.

Returning now to FIG. 1, the computing system 102, in response to having received the request for image data 112, returns low-resolution image data (box 116). FIG. 1 illustrates that the low-resolution image data 132 is one of multiple sets of image data layers 132, 134, and 136 that are generated from image 130. As described with respect to FIG. 2, the image data 132 may be a reduced-resolution version of the image 130 to which various transformation and data compression algorithms have been applied. As such, the low-resolution image data 132 may require processing before its display as an image, and thus low-resolution image data 132 is illustrated in FIGS. 1 and 2 as a shaded block of data rather than as an image.

In some examples, the low-resolution image data 132 is a lowest-generated layer of image data generated by the process of box 114. In some examples, the process of box 114 previously-generated multiple layers of image data, and the computing system 102 selects an appropriate layer of data to send to the computing device 104 based on display characteristics of the computing device 104. As such, the computing system 102 may serve different layers of image data to different computing devices with different display characteristics, in response to an initial request for the same image from each of the different computing devices.

At box 118, the computing device 104 receives the low-resolution image data 132, processes the low-resolution image data 132 to generate data that is displayable as low-resolution image 140, and then displays low-resolution image 140, for example, on an LCD display of the computing device 104. More specifically, the computing device 104 may receive the image data 132 over a network, such as the internet, where the computing device 104 may be geographically remote and separate from the computing system 102. The computing device 104 may need to undo the transformation and data compression processes that were applied to the image data 132 by the computing system 102, in order to revert the image data 132 back into viewable form as low-resolution image 140.

For example, the computing device 104 may decompress the image data 132 by applying a process to reverse the compression process applied in box 212 (e.g., by reversing the gzip and deflate compression process). The decompression of the image may be performed by the native implementation of the deflate decompression algorithm that is found within many web browsers. As previously mentioned, other compression and decompression algorithms may be used. Some web browsers, however, may not include native implementations of some decompression algorithms. As a result, decompression instructions can be described in scripting language (e.g., JavaScript) and thereafter executed by a scripting language engine of the web browser, if desired. Executing a decompression algorithm with a scripting language engine in the web browser, however, can be less efficient than executing the decompression algorithm with a decompression algorithm natively implemented within the web browser. Moreover, the decompression instructions may need to be transmitted to the computing device, which can further delay the time needed to display the image. Still, many of the benefits of the technology discussed in this description may be realized regardless whether the decompression algorithm is natively implemented by a web browser.

At box 120, the computing device 104 sends a request 120 for intermediate-resolution image data to the computing system 102. The computing device 104 may send the request in response to user input that is received after the computing device 104 displays the low-resolution image 140, or may be automatically sent by the computing device 104 after the low-resolution image data 132 is received by the computing device 104 and without user input subsequent to the computing device 104 receiving the low-resolution image data 132.

As an illustration, the computing device 104 may display the low-resolution image 104 on a display of the computing device 104. Despite this document referring to the image as being "low-resolution," the resolution may match or exceed the display capabilities of the computing device 104. Should the user desire to zoom into the image, for example to view a portion of human anatomy depicted in the image with greater detail, the present version of the image that is stored by the computing device 104 may not be of sufficient resolution to display the zoomed-in area with detail that matches or exceeds the resolution capacities of the computing device 104. As such, a higher-resolution image for the zoomed-in area may be beneficial, and the computing device 104 may send a request 120 for information from which a higher-resolution image can be generated.

The computing device 104 may send the request 120 in response to the computing device 104 receiving user input that requests display of higher-resolution image data, such as a request to cause the display of the computing device to zoom into the image so that a certain portion of the image is enlarged to occupy a larger space of the display than before the zooming operation. In some examples, the computing device 104 may send the request 120 after the computing device 104 receives the initial image data 132 and without receipt of user input at the computing device at all, or without receipt of user input at the computing device that is directed toward sending the request 120. As such, the computing device 104 may receive data 134 for generating a higher-resolution version of the image before a user interacts with the image, and since the data 134 is already stored at the computing device 104, the computing device 104 may be able to present a zoomed-in display of the image immediately in response to a user input request to perform a zooming action, without receiving data from computing system 102 after receiving the user input request to perform the zooming action.

In some implementations, the computing system 102 sends the intermediate-resolution image data 134 without receiving another request from the computing device 104. For example, the computing system may be configured to initially send the low-resolution image data 132 and then, immediately or after a delay, send the intermediate-resolution image data without receiving from device 104 a request for such data that is independent of the initial request 112.

In some implementations, the data 134 that the computing system sends to computing device 104 in response to request 120 is information that the computing device 104 can process, with or without decompression and data transformations, and without other image data, to generate a higher-resolution display of an image (e.g., such as by sending a set of the "A" values shown in FIG. 3, or a transformed and/or compressed version thereof). Still, the amount of data transmitted from the computing system 102 to the computing device 104 in response to request 120 may be reduced by transmitting the "D" and "M" values for the layer of image data from which the "A" values were previously sent, instead of sending the "A" values for a higher-resolution level (e.g., because the M value may be a 2-bit value which is smaller than a 16-bit A value, and because the D and M values may have lower entropy than A values and thus may compress better). This is because the computing device 104 may be able to combine the "A" information from the previously-sent image 140 with "D" and "M" values to losslessly create a higher-resolution version of the image, as described below.

At box 124, the computing device, after having received the image data 134, generates an intermediate-resolution image by combining data from the low-resolution image 140 with the newly-received image data 134. In some examples, the computing device 104 may be unable to generate a display of an image that reasonably approximates the content depicted by full-resolution image 130 from the intermediate-resolution image data 134, without using the data in image 140. As a loose and not entirely accurate generalization, the computing-device 104 may use the intermediate-resolution image data 134 to "fill in" detail in the previously-displayed image 140. The algorithms for recreating a higher-resolution image from a low-resolution image and additional data are described earlier in this description. For example, the reduced-resolution version of the image 230 (FIG. 3) can be recreated using values A1', D1', D2', D3', and M'. The algorithms for doing so follow. P1=D1+A. P2=D2+A. P3=D3+A. P4=(A*4)−P1−P2−P3+M. As such, a value for a pixel from a higher-resolution image can be generating using a value of a pixel from a lower-resolution image and some of the recently-received data.

Although FIG. 1 depicts an example in which the computing system 102 sends two groups of image information 132 and 134 in response to two requests 112 and 120, the computing system 102 may send further sets of image information, which the computing device 104 can use to generate even yet higher-resolution versions of the image until the computing device 104 has losslessly reconstructed the full resolution of image 130. For example, in response to a subsequent request from computing device 104 to computing system 102, the computing system 102 may send image data 136, from which the full resolution of image 130 may be constructed.

In some implementations, the computing system 102 may send multiple layers of image data in response to a single request. For example, the computing system 102 may send image data 134 and image data 136 in response to a single request from the computing device 104. An example scenario in which such an action may be helpful is when user input is received that significantly zooms into the image. For instance, a modest zoom may only require image data 134 to adequately display the image at a higher resolution, but if the zoom is substantial, then computing system 102 may determine that image data 136 should also be sent to the computing device 104. The computing device 104 may then perform two iterations of the process to decompress the image and reverse the transformations.

In some implementations, the image 130 is segmented into multiple "tiles," where each tile represents a region of the image 130 (e.g., the image may comprise a two-by-two grid of tiles). The computing system 130 may transform each individual tile into multiple layers of lower-resolution image data, as described with respect to image 130 in this description. As such, in response to a request 112 for a low-resolution version of the image, the computing system 102 may send to the client computing device 104 one or more blocks of image data, where each block of image data represents a lower-resolution version of a respective tile of the image. A benefit to having layers of image data for each of multiple tiles becomes apparent when a user request to zoom into the image is received. The zoomed area may only require data from a subset of the tiles that comprise the image, and thus, the computing system 102 may only have to send additional image data for that subset of tiles. As such, the request from the computing device 104 to the computing system 102 may specify the region of the image to which the user has requested a zoomed display, or may specify the tiles for which intermediate-resolution image data is desired.

Figure 6:
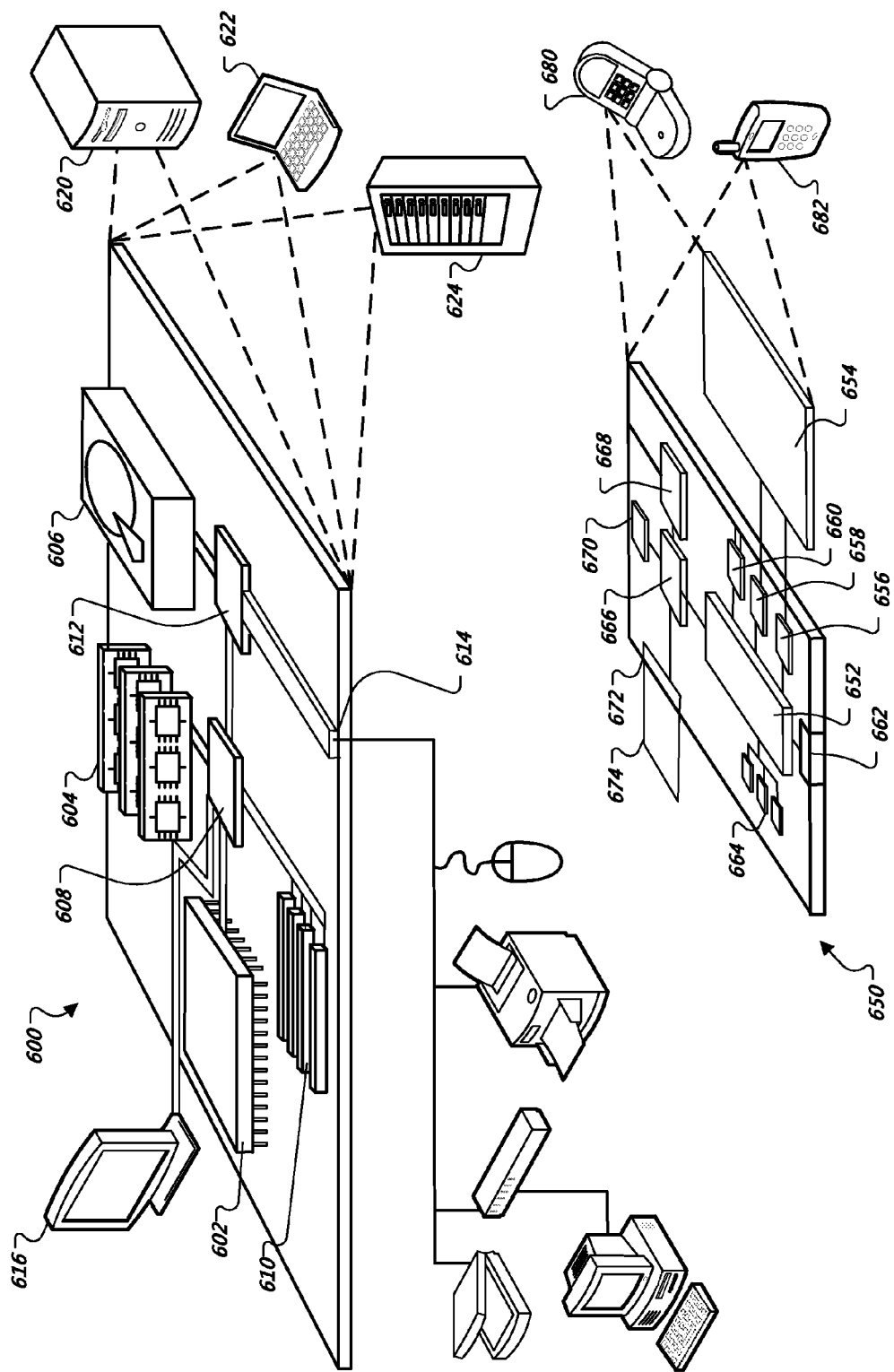
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is by way of example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, some of which are shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A server system may be a combination of hardware and software that provides a service or a set of services. For example, a set of physically separate and networked computerized devices may operate together as a logical server system unit to handle the operations necessary to offer a service to hundreds of computing devices. The computing system described in this document may be a server system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

In some embodiments, a computer-implemented method for transforming data includes receiving, by a computing system, data that includes multiple values that are each stored within a respective multi-byte data unit. Each of the multiple values is encoded by a quantity of bits that is less than a number of bits in each multi-byte data unit, wherein the quantity of bits that encode each of the multiple values fully occupy a least-significant byte of each multi-byte data structure and only partially occupy a most-significant byte of each multi-byte data structure. The computing system moves some of the bits in the quantity of bits in each of the multiple values to the most-significant byte of each multi-byte data structure, so that the quantity of bits that encode each of the multiple values no longer fully occupy the least-significant byte of each multi-byte data structure. The computing system compresses the data that includes the multiple values that are each stored within a respective multi-byte data unit after the some of the bits in the quantity of bits has been moved.

As additional description to the embodiments described above, the present disclosure describes the following embodiments.

Embodiment 21 is a computer-implemented method for increasing the compressibility of data that includes a collection of multi-byte data units by decreasing a number of unique values represented by the lowest-byte of each multi-byte data unit, comprising. The method comprises identifying, by a computing system, data that represents a collection of values, where each value is represented by a multi-byte data unit in a collection of multi-byte data units that together form the data. The method comprises identifying, by the computing system, a quantity of bits that are used to represent the value in each of the multi-byte data units, wherein the quantity of bits spans a range of bits in each multi-byte data unit and is less than all of the bits that form each multi-byte data unit. The method comprises moving, by the computing system, a subset of bits in each multi-byte data unit from (i) occupying part of a first byte of the multi-byte data unit and part of a second byte of the multi-byte data unit to (ii) only occupying part of the second byte of the multi-byte data unit without occupying part of the first byte of the multi-byte data unit. The method comprises mapping, by the computing system after the computing system has moved the subset of bits in each multi-byte data unit, values identified by each of the bytes in the data to new values that use one or more fewer bits than a byte. The method comprises compressing, by the computing system, the data after the computing system has moved the subset of bits and then mapped the values.

Embodiment 22 is the computer-implemented method of embodiment 21, wherein the data that represents the collection of values is image data, and the values are values for multiple corresponding pixels.

Embodiment 23 is the computer-implemented method of embodiment 21, wherein the data that represents the collection of values includes data generated by a scientific test instrument, and the values are individual measurements that were generated by the scientific test instrument.

Embodiment 24 is the computer-implemented method of embodiment 21, wherein the multi-byte data unit is a two-byte data unit; and moving the subset of bits in each multi-byte data unit includes moving bits located in an upper half of the range of bits in each multi-byte data unit to a different location in each multi-byte data unit, while leaving bits located in a lower half of the range of bits in each multi-byte data unit in their original location.

Embodiment 25 is the computer-implemented method of embodiment 24, wherein the range of bits occupies all of a lowest byte of the multi-byte data unit and a subset of a highest byte of the multi-byte data unit.

Embodiment 26 is the computer-implemented method of embodiment 21, wherein moving the subset of bits in each multi-byte data unit includes inserting binary zeros in a portion of the first byte at which the subset of bits had previously been located.

Embodiment 27 is the computer-implemented method of embodiment 21, wherein moving the subset of bits in each multi-byte data unit includes spreading binary data that is encoded in each multi-byte data unit evenly between a first byte of each multi-byte data unit and a second byte of each multi-byte data unit, so that the binary data is represented by a certain number of bits in the first byte of each multi-byte data unit and a certain number of bits in the second byte of each multi-byte data unit.

Embodiment 28 is the computer-implemented method of embodiment 27, wherein: the certain number of bits in the first byte is same as the certain number of bits in the second byte; the certain number of bits in the first byte is a subset of bits that form the first byte; and the certain number of bits in the second byte is a subset of bits that form the second byte.

Embodiment 29 is the computer-implemented method of embodiment 21, further comprising generating, by the computing system after the shifting has occurred, a lookup table that assigns a commonly-occurring value in the collection of multi-byte data units to a new value that uses one or more fewer bits than the commonly-occurring value, wherein the lookup-table is used in the mapping.

Embodiment 30 is directed to one or more computer-readable devices including instructions that, when executed by one or more computer processors, cause performance of actions according to the method of any one of embodiments 21 to 30.

What is claimed is:
1. A computer-implemented method for sending image data to a client device, comprising:
  receiving, by a computing system, a first request to send image data to a computing device;
  generating, by the computing system, first image data by moving a subset of bits in a multi-byte representation of a pixel, so that the subset of bits is moved from occupying part of a first byte of the multi-byte representation of the pixel and part of a second byte of the multi-byte representation of the pixel to only occupying part of the second byte of the multi-byte representation of the pixel, wherein the computing device is able to generate an initial display of an image from the first image data;

sending, by the computing system and for receipt by the computing device in response to having received the first request, the first image data, wherein the initial display of the image is a reduced-resolution version of the image that is reduced in resolution in comparison to a full resolution of the image;

receiving, by the computing system, a second request to send image data to the computing device; and sending, by the computing system and for receipt by the computing device in response to having received the second request, second image data from which the computing device is able to generate a subsequent display of the image, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

2. The computer-implemented method of claim 1, wherein generating the first image data includes compressing data that encodes the initial display of the image or data that represents a transformation of the data that encodes the initial display of the image.

3. The computer-implemented method of claim 1, wherein the intermediate-resolution version of the image is configured so that a computer is able to losslessly recreate the full resolution of the image by combining the intermediate-resolution version of the image with additional image data.

4. The computer-implemented method of claim 1, wherein the second image data contains insufficient information from which to generate a display of a version of the image without additional image data.

5. The computer-implemented method of claim 1, wherein generating the first image data includes generating a portion of the first image data that represents a value for a pixel in the initial display of the image by combining values for multiple pixels in a version of the image that is higher in resolution than the initial display of the image.

6. The computer-implemented method of claim 1, wherein the second request to send image data to the computing device was sent by the computing device for receipt by the computing system as a result of the computing device receiving user input to zoom into the initial display of the image.

7. The computer-implemented method of claim 1, further comprising determining, by the computing system and based on data that identifies display characteristics of the computing device, to send the first image data, from which the computing device is able to generate the reduced-resolution version of the image, in distinction to image data from which other resolution versions of the image are able to be generated.

8. The computer-implemented method of claim 1, wherein a stored-in-memory size of the intermediate-resolution version of the image is greater than a stored-in-memory size of an uncompressed form of the second image data.

9. A computer-implemented method for sending image data to a client device, comprising:

receiving, by a computing system, a first request to send image data to a computing device;

generating, by the computing system, first image data, wherein pixel values in an image are each encoded in a two-byte data unit, and wherein generating the first image data includes:

(i) identifying, by the computing system, a quantity of bits in each two-byte data unit in which pixel values are encoded, wherein the quantity of bits is a subset of all bits in the two-byte data unit, wherein the quantity of bits span a range of bits in each two-byte data unit, and (ii) shifting, by the computing system, bits located in an upper half of the range of bits in each two-byte data unit to a different location in each two-byte data unit, while leaving bits located in a lower half of the range of bits in each two-byte data unit in their original location;

sending, by the computing system and for receipt by the computing device in response to having received the first request, the first image data, from which the computing device is able to generate an initial display of an image, wherein the initial display of the image is a reduced-resolution version of the image that is reduced in resolution in comparison to a full resolution of the image;

receiving, by the computing system, a second request to send image data to the computing device; and sending, by the computing system and for receipt by the computing device in response to having received the second request, second image data from which the computing device is able to generate a subsequent display of the image, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

10. The computer-implemented method of claim 9, wherein the range of bits occupies all of a lowest byte of the two-byte data unit and a subset of a highest byte of the two-byte data unit.

11. The computer-implemented method of claim 9, wherein generating the first image data includes compressing a combination of two-byte data units that together comprise the image, after the computing system has shifted the bits located in the upper half to the different location.

12. The computer-implemented method of claim 1, wherein moving the subset of bits from occupying part of the first byte and part of the second byte to only occupying part of the second byte includes inserting binary zeros in a portion of the first byte at which the subset of bits had previously been located.

13. A computer-implemented method for sending image data to a client device, comprising:

receiving, by a computing system, a first request to send image data to a computing device;

sending, by the computing system and for receipt by the computing device in response to having received the first request, first image data from which the computing device is able to generate an initial display of an image, wherein the initial display of the image is a reduced-resolution version of the image that is reduced in resolution in comparison to a full resolution of the image;

receiving, by the computing system, a second request to send image data to the computing device;

generating, by the computing system, second image data by spreading binary data that is encoded in a plurality of two-byte data units evenly between a first byte of each two-byte data unit and a second byte of each two-byte data unit, so that the binary data is represented by a certain number of bits in the first byte of each two-byte data unit and a certain number of bits in the second byte of each two-byte data unit, and sending, by the computing system and for receipt by the computing device in response to having received the second request, the second image, wherein the computing device is able to generate a subsequent display of the image from the second image data, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

14. The computer-implemented method of claim 13, wherein:

the certain number of bits in the first byte is same as the certain number of bits in the second byte;

the certain number of bits in the first byte is a subset of bits in the first byte; and the certain number of bits in the second byte is a subset of bits in the second byte.

15. The computer-implemented method of claim 14, wherein the binary data that is encoded in the plurality of two-byte data units is a result of a delta encoding process performed by the computing system on a full resolution of the image or a reduced-resolution version of the image.

16. One or more computer-readable devices including instructions that, when executed by one or more computer processors, cause performance of operations that comprise:

receiving, by a computing system, a first request to send image data to a computing device;

generating, by the computing system, first image data by moving a subset of bits in a multi-byte representation of a pixel, so that the subset of bits is moved from occupying part of a first byte of the multi-byte representation of the pixel and part of a second byte of the multi-byte representation of the pixel to only occupying part of the second byte of the multi-byte representation of the pixel, wherein the computing device is able to generate an initial display of an image from the first image data;

sending, by the computing system and for receipt by the computing device in response to having received the first request, the first image data, wherein the initial display of the image is a reduced-resolution version of the image that is reduced in resolution in comparison to a full resolution of the image;

receiving, by the computing system, a second request to send image data to the computing device; and sending, by the computing system and for receipt by the computing device in response to having received the second request, second image data from which the computing device is able to generate a subsequent display of the image, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

17. A computer-implemented method, comprising:

receiving, by a computing system, a first request to send image data to a computing device from which the computing device is able to generate an initial display of an image;

generating, by the computing system, first image data from a full resolution of the image and second image data from the full resolution of the image, wherein generating the first image data includes:

(i) generating a reduced-resolution version of the image that is reduced in resolution in comparison to the full resolution of the image, wherein pixels in the reduced-resolution version of the image are stored in multi-byte data units, (ii) rearranging a number of bits that encode a value of each pixel in each respective multi-byte data unit evenly between each byte in the respective multi-byte data unit, and (iii) sending data encoded in the multi-byte data units through a compression process after the number of bits that encode the value of each pixel for each respective multi-byte data unit has been evenly rearranged;

sending, by the computing system and for receipt by the computing device in response to having received the first request, the first image data from which the computing device is able to generate the initial display of the image, wherein the initial display of the image is the reduced-resolution version of the image that is reduced in resolution in comparison to a full resolution of the image;

receiving, by the computing system, a second request to send image data to the computing device from which the computing device is able to generate a subsequent display of the image; and sending, by the computing system and for receipt by the computing device in response to having received the second request, the second image data from which the computing device is able to generate the subsequent display of the image, wherein the subsequent display of the image is an intermediate-resolution version of the image that has a resolution that is higher than a resolution of the reduced-resolution version of the image and that is lower than the full resolution of the image, wherein a portion of the second image data was previously generated by subtracting a value for a pixel in the initial display of the image from a value for a pixel in the intermediate-resolution version of the image, and wherein the second image data is configured so that the computing device is able to generate the subsequent display of the image by combining the second image data with the first image data.

18. One or more computer-readable devices including instructions that, when executed by one or more computer processors, cause performance of operations that comprise:

receiving, by a computing system, a first request to send image data to a computing device;

generating, by the computing system, first image data, wherein pixel values in an image are each encoded in a two-byte data unit, and wherein generating the first image data includes:
(i) identifying, by the computing system, a quantity of bits in each two-byte data unit in which pixel values are encoded, wherein the quantity of bits is a subset of all bits in the two-byte data unit, wherein the quantity of bits span a range of bits in each two-byte data unit, and
(ii) shifting, by the computing system, bits located in an upper half of the range of bits in each two-byte data unit to a different location in each two-byte data unit, while leaving bits located in a lower half of the range of bits in each two-byte data unit in their original location;

sending, by the computing system and for receipt by the computing device in response to having received the first request, the first image data, from which the computing device is able to generate an initial display of an image, wherein the initial display of the image is a reduced-resolution version of the image that is reduced in resolution in comparison to a full resolution of the image;

receiving, by the computing system, a second request to send image data to the computing device; and sending, by the computing system and for receipt by the computing device in response to having received the second request, second image data from which the computing device is able to generate a subsequent display of the image, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

19. One or more computer-readable devices including instructions that, when executed by one or more computer processors, cause performance of operations that comprise:

receiving, by a computing system, a first request to send image data to a computing device;

sending, by the computing system and for receipt by the computing device in response to having received the first request, first image data, from which the computing device is able to generate an initial display of an image, wherein the initial display of the image is a reduced-resolution version of the image that is reduced in resolution in comparison to a full resolution of the image;

receiving, by the computing system, a second request to send image data to the computing device;

generating, by the computing system, second image data by spreading binary data that is encoded in a plurality of two-byte data units evenly between a first byte of each two-byte data unit and a second byte of each two-byte data unit, so that the binary data is represented by a certain number of bits in the first byte of each two-byte data unit and a certain number of bits in the second byte of each two-byte data unit, and sending, by the computing system and for receipt by the computing device in response to having received the second request, the second image, wherein the computing device is able to generate a subsequent display of the image from the second image data, wherein the subsequent display of the image is an intermediate-resolution version of the image that has a resolution that is higher than a resolution of the reduced-resolution version of the image and that is lower than the full resolution of the image, and wherein the second image data is configured so that the computing device is able to generate the subsequent display of the image by combining the second image data with the first image data.

* * * * *